F. S. ELLETT.
BACK PEDALING COASTER BRAKE.
APPLICATION FILED MAY 1, 1908.

925,085.

Patented June 15, 1909.

WITNESSES:
D. Gurnee
C. W. Carroll

INVENTOR:
Frederick S. Ellett
by Osgood & Davis
his attorneys

UNITED STATES PATENT OFFICE.

FREDERICK S. ELLETT, OF ELMIRA, NEW YORK, ASSIGNOR TO ECLIPSE MACHINE COMPANY, OF ELMIRA, NEW YORK.

BACK-PEDALING COASTER-BRAKE.

No. 925,085.  Specification of Letters Patent.  Patented June 15, 1909.

Application filed May 1, 1908. Serial No. 430,400.

*To all whom it may concern:*

Be it known that I, FREDERICK S. ELLETT, a citizen of the United States, and resident of Elmira, in the county of Chemung and State of New York, have invented certain new and useful Improvements in Back-Pedaling Coaster-Brakes, of which the following is a specification.

This invention relates to back pedaling coaster brakes, and has for its object a powerful brake, reduction of friction on forward driving, cheap construction, and simplicity in assembling.

Figure 1:
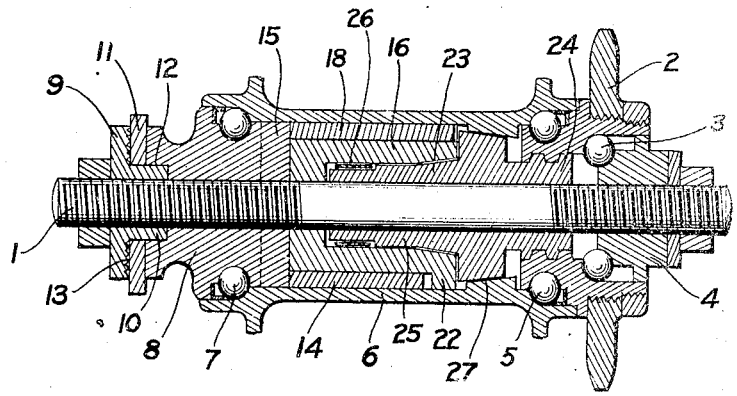
Figure 2:
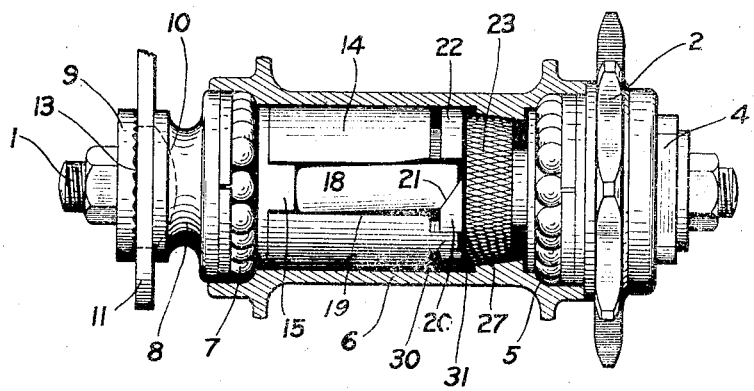
Figure 3:
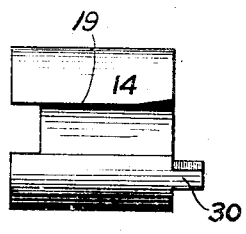
Figure 4:
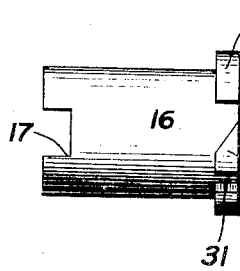
Figure 5:
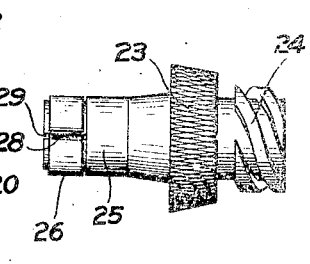

In the drawings:—Figure 1 is a central longitudinal section of the complete device; Fig. 2 is a similar section of the hub, showing its contents; and Figs. 3 to 5, inclusive, show different parts of the device.

1 is the axle which is intended to be held stationary within the rear forks of the bicycle frame. The driving sprocket 2 is revolubly supported by the ball race 3 on the cone 4 which is screwed upon one end of the axle. The sprocket in turn carries a ball race 5 for one end of the driven hub 6. The opposite end of the driven hub is revolubly supported by balls 7 in a race on the stationary brake block 8. The latter is represented as screwed upon the end of the axle and is held against rotation by a device that is one of the novel improvements for which protection is asked in a separate application, Serial No. 462,822. It consists of a washer 9 that has upon its inner face a lug 10 on each side of the axle, that is adapted to pass through the slot in the end of the rear fork 11 of the velocipede frame, which receives the axle 1, and enter a corresponding recess 12 in the stationary brake block 8. In addition to the inwardly projecting lug 10, the washer may have teeth 13 on its inner side to engage the outer side of the fork 11, for the purpose of preventing the slot in the end of the fork from spreading under the torsion put on the lug 10 on back pedaling. The brake element of the device also contains novel features. Braking action is applied to the hub by an expansible friction brake element 14 that projects into it from the stationary block 8 to which it is anchored. An inwardly projecting diametral lug 15 on the block 8 effects the anchoring connection by entering a recess in the expansible brake element, and the sleeve 16 that supports it. This sleeve is also recessed diametrically at 17 to receive the lug 15, so that it is non-revoluble, though movable longitudinally to some extent.

The special novelty of the brake lies in the use of a lever as a brake actuator that in turn is actuated by a part movable in line with the axis of the hub and operated by the driver on back pedaling.

In the construction shown in the drawings, the brake proper 14 is a split ring, held against rotation as described, and the lever 18 is supported by the sleeve 16 between the edges 19 of the brake, while the latter is actuated by a wedge 20 that is moved longitudinally inwardly, on back pedaling, against a corresponding wedge face 21 on the lever. The wedge 20 is represented as formed on the flange 22 on the end of the sleeve 16, which is nonrotative and movable longitudinally as previously explained. Accordingly, the split brake ring 14 is held at both sides against rotation by connection with nonrotary parts, namely, the diametral lug 15, and the wedge-shaped shoulder 20 that projects radially from the nonrotary sleeve 16.

Any suitable connector between the driving sprocket 2 and the wedge 22 may be employed to cause the latter to move in upon the lever on back pedaling. In the drawings a longitudinally shifting nut 23 is shown. This carries at one end a screw threaded sleeve 24 upon which the driving sprocket is mounted, and at its other end a sleeve 25 that enters the non-revoluble sleeve 16 and carries the retarder 26. On forward pedaling the same connector is employed to effect driving connection between the sprocket 2 and the hub, for when moved to the right it engages a friction surface 27 in the inside of the hub.

Finally, the retarder itself is a novel feature for which protection is desired. This consists of a split expansible ring 26 (see Fig. 5), the forward end of which is free and normally sprung outwardly against a nonrevoluble part of the mechanism, (in the construction shown it engages the nonrevoluble sleeve 16) and the other end of which is attached to the sleeve 25 of the revoluble connector 23.

In the drawings, the connection between the retarding ring 26 and the sleeve 25 of the connector is effected by inserting the inwardly turned end 28 into a slit 29 in the sleeve.

On forward pedaling the retarder checks rotation of the connector 23 till the sprocket, connector and hub are all locked together, when its rotation in a forwardly direction compresses the retarder 26, bringing its ends nearer together, so that there is little or no frictional contact between the retarder and the stationary sleeve 16. But on back pedaling the retarding ring 26 is opened out against the nonrevoluble sleeve 16, effectively holding the connector against rotation, so that backward rotation of the sprocket 2 causes the connector to move in against the sleeve 16, thereby forcing the wedge 20 against the brake-actuating lever 18 and expanding the brake out against the hub.

A more uniform expansion of the brake ring 14 is obtained if at its outer end, back of the lever, it is attached to the nonrevoluble sleeve 16, as by the lug 30 in the recess 31 in the flange 22 of the sleeve.

What I claim is:—

1. In a coaster brake, the combination with an axle, of a hub revolubly supported thereon, a rotary driver for the hub; a nonrevoluble split brake ring within the hub, and normally disengaged therefrom; a lever longitudinally disposed within the hub, and entering between separated edges of said brake ring; an actuator, adapted to move longitudinally to engage and operate said lever; and coöperating means between the driver and actuator operated by the driver on back pedaling for moving said actuator longitudinally, substantially as shown and described.

2. In a coaster brake, the combination with an axle, of a hub revolubly supported thereon; a rotary driver for the hub; a nonrevoluble split brake ring within the hub, and normally disengaged therefrom; a lever longitudinally disposed within the hub, and entering between separated edges of said brake ring; a non-rotary actuator adapted to move longitudinally to engage and operate said lever; and means operated by the reverse rotation of the driver for moving said actuator longitudinally; substantially as shown and described.

3. In a coaster brake, the combination with an axle, of a hub revolubly supported thereon; a rotary driver for the hub; a nonrevoluble split brake ring within the hub, and normally disengaged therefrom; a lever, longitudinally disposed within the hub, and entering between separated edges of said brake ring; a nonrotary wedge adapted to move longitudinally to engage and operate said lever; and means operated by the driver on back pedaling for moving said wedge; substantially as shown and described.

4. In a coaster brake, the combination with an axle, of a hub revolubly supported thereon; a driver; a nonrevoluble, longitudinally movable sleeve upon the axle within the hub; a nonrevoluble, split brake ring supported by said sleeve, normally disengaged from the hub; a lever longitudinally disposed within the hub, and entering between separated edges of the brake ring; a nonrotary wedge carried by the sleeve, and adapted to move longitudinally to engage said lever and operate it; and means operated by the driver on back pedaling for moving said wedge; substantially as shown and described.

5. In a coaster brake, the combination with an axle, of a hub revolubly supported thereon; a driver; a nonrotary sleeve upon the axle within the hub, having a radially projecting shoulder; a split brake-ring within the hub, held against rotation by connections at its outer end to a nonrotary part, and in line therewith, at its inner end, engaging the shoulder on said nonrotary sleeve; a lever longitudinally disposed within the hub alongside the point of engagement of the said brake ring with the nonrotary sleeve, and entering between separated edges of the brake ring; and means operated by the driver on back pedaling for operating said lever to expand the brake ring; substantially as shown and described.

6. In a coaster brake, the combination with the driver 2 of the longitudinally shiftable connector 23, having a longitudinal slit 29; the split spring band retarder 26 bent at one end to enter the slit in said connector; and means operated by said driver for shifting said connector; substantially as shown and described.

FREDERICK S. ELLETT.

Witnesses:
LEONARD S. WHITTIER,
A. C. RICE.